(12) United States Patent
Takagi et al.

(10) Patent No.: US 9,410,025 B2
(45) Date of Patent: Aug. 9, 2016

(54) POLYOLEFIN-BASED RESIN EXPANDED BEADS COMPRISING INORGANIC FILLERS

(71) Applicant: JSP CORPORATION, Tokyo (JP)

(72) Inventors: Shota Takagi, Yokkaichi (JP); Akinobu Hira, Kanuma (JP); Kazutoshi Sasaki, Nikko (JP)

(73) Assignee: JSP CORPORATION, Tokyo (JP)

( * ) Notice: Subject to any disclaimer, the term of this patent is extended or adjusted under 35 U.S.C. 154(b) by 16 days.

(21) Appl. No.: 14/555,967

(22) Filed: Nov. 28, 2014

(65) Prior Publication Data

US 2015/0158990 A1 Jun. 11, 2015

(30) Foreign Application Priority Data

Dec. 11, 2013 (JP) ................................. 2013-256534

(51) Int. Cl.

| | |
|---|---|
| *B32B 5/16* | (2006.01) |
| *C08J 9/228* | (2006.01) |
| *B29C 44/04* | (2006.01) |
| *B29C 44/34* | (2006.01) |
| *B29C 44/44* | (2006.01) |
| *C08J 9/00* | (2006.01) |
| *C08J 9/16* | (2006.01) |

(Continued)

(52) U.S. Cl.
CPC ................ *C08J 9/228* (2013.01); *B29C 44/04* (2013.01); *B29C 44/3461* (2013.01); *B29C 44/445* (2013.01); *C08J 9/0061* (2013.01); *C08J 9/0066* (2013.01); *C08J 9/16* (2013.01); *C08J 9/224* (2013.01); *C08J 9/232* (2013.01); *C08J 2323/02* (2013.01); *C08J 2323/06* (2013.01); *C08J 2323/14* (2013.01); *C08J 2323/20* (2013.01); *C08J 2423/02* (2013.01); *C08J 2423/26* (2013.01); *Y10T 428/2998* (2015.01)

(58) Field of Classification Search
USPC ................................................... 428/407, 403
See application file for complete search history.

(56) References Cited

U.S. PATENT DOCUMENTS

| | | | | |
|---|---|---|---|---|
| 4,207,378 A | * | 6/1980 | Klein ..................... | B01D 39/04 428/402 |
| 4,521,482 A | * | 6/1985 | Arai et al. ..................... | 428/336 |
| 6,027,806 A | * | 2/2000 | Abe et al. ..................... | 428/407 |

(Continued)

FOREIGN PATENT DOCUMENTS

| | | |
|---|---|---|
| EP | 1 593 475 A1 | 11/2005 |
| EP | 2 447 311 A1 | 5/2012 |

(Continued)

OTHER PUBLICATIONS

Nutter & Benning, Filled Polyethylene Foams, J. of Cellular Plastics, 1966.*

(Continued)

*Primary Examiner* — Holly Le
(74) *Attorney, Agent, or Firm* — Oliff PLC

(57) ABSTRACT

An inorganic filler-containing, polyolefin-based resin expanded bead having an expanded core layer of a first polyolefin-based resin, and a cover layer of a second polyolefin-based resin that covers the expanded core layer, wherein a weight ratio of the cover layer to the expanded core layer is 1:99 to 20:80, the expanded core layer contains an inorganic filler in a weight percentage amount of 5 to 90%, and the cover layer contains no inorganic filler or contains an inorganic filler in a weight percentage amount lower than that in the expanded core layer.

5 Claims, 2 Drawing Sheets

(51) Int. Cl.
  *C08J 9/224* (2006.01)
  *C08J 9/232* (2006.01)

(56) References Cited

U.S. PATENT DOCUMENTS

| | | |
|---|---|---|
| 7,671,820 B2 | 3/2010 | Tokoro et al. |
| 8,084,510 B2 * | 12/2011 | Morioka et al. ............... 521/59 |
| 8,518,540 B2 * | 8/2013 | Sakaguchi et al. ............ 428/403 |
| 2003/0162012 A1 * | 8/2003 | Sasaki .................... C08J 9/224 |
| | | 428/323 |
| 2005/0215652 A1 | 9/2005 | Tanaka et al. |
| 2008/0108717 A1 | 5/2008 | Tokoro et al. |
| 2008/0230956 A1 | 9/2008 | Allmendinger et al. |
| 2012/0100376 A1 | 4/2012 | Sakaguchi et al. |
| 2012/0270052 A1 * | 10/2012 | Nehls ................... B29C 67/205 |
| | | 428/404 |

FOREIGN PATENT DOCUMENTS

| | | |
|---|---|---|
| JP | H1077359 A | 3/1998 |
| JP | 2003226775 A | 8/2003 |
| JP | A-2008-512502 | 4/2008 |

OTHER PUBLICATIONS

May 8, 2015 Extended Search Report issued in European Application No. 14195423.0.

* cited by examiner

POLYOLEFIN-BASED RESIN EXPANDED BEADS COMPRISING INORGANIC FILLERS

BACKGROUND OF THE INVENTION

1. Field of the Invention

The present invention relates to polyolefin-based resin expanded beads containing an inorganic filler.

2. Description of Prior Art

There has been developed a technology in which an inorganic filler is incorporated into polyolefin-based resin expanded beads for the purpose of imparting improved mechanical strength or a desired functionality such as flame retardancy to molded articles obtained from the expanded beads. For example, U.S. patent Application Publication No. 200810108717 A1 corresponding to Japanese Patent Application Publication No. 2008-512502, and U.S. Pat. No. 7,671,820 disclose production of a dielectric molded article from polyolefin-based resin expanded beads containing an inorganic filler.

When polyolefin-based resin expanded beads contain a large amount of an inorganic filler, production of molded articles from the expanded beads encounters problems such as formation of open cells and insufficient fusion bonding between the expanded beads. When the fusion bonding between the expanded beads is deteriorated, the obtained molded articles become very brittle. Insufficient fusion bonding between the expanded beads is significant especially when molded articles produced have a large thickness.

Fusion bonding between polyolefin-based resin expanded beads may sufficiently proceed when the in-mold molding of the expanded beads is carried out using a high molding pressure. In this case, however, the expanded beads are liable to form an open cell structure or to be broken in a surface part of the molded article. Breakage of the expanded beads in a surface of the molded article causes a significant difference in density between the surface region and the inner region of the molded article, which results in a difference in content of the inorganic filler per unit volume of the molded article between in the surface region and in the inner region. The non-uniform distribution of the inorganic filler in the molded article may result in non-uniformity or insufficiency of the desired functionality to be imparted by the inorganic filler.

SUMMARY OF THE INVENTION

It is an object of the present invention to provide an inorganic filler-containing, polyolefin-based resin expanded beads which show good in-mold moldability such as fusion-bonding property notwithstanding their inclusion of the inorganic filler.

In accomplishing the above object, there is provided in accordance with one aspect of the present invention:

(1) A polyolefin-based resin expanded bead, comprising an expanded core layer comprising a first polyolefin-based resin, and a cover layer that covers the expanded core layer and that comprises a second polyolefin-based resin, wherein a weight ratio of the cover layer to the expanded core layer is 1:99 to 20:80, the expanded core layer contains an inorganic filler in a weight percentage amount of 5 to 90%, and the cover layer contains no inorganic filler or contains an inorganic filler, which is the same or different from the inorganic filler contained in the expanded core layer, in a weight percentage amount lower than that of the inorganic filler in the expanded core layer.

The present invention also provides:

(2) The polyolefin-based resin expanded bead according to above (1), wherein the weight percentage amount of the inorganic filler in the expanded core layer is 30% or more and 90% or less.

(3) The polyolefin-based resin expanded bead according to above (1), wherein the first polyolefin-based resin contains a carboxylic acid-modified or carboxylic acid anhydride-modified polyolefin resin in such an amount that a carboxylic acid or carboxylic acid anhydride component content of the first polyolefin-based resin is 0.15 to 10% by weight.

(4) The polyolefin-based resin expanded bead according to above (1), wherein the weight percentage amount of the inorganic filler in the cover layer is less than 5% or no inorganic filler is contained in the cover layer.

Hereinafter, "polyolefin-based resin" will be occasionally referred to as "PO resin" for the purpose of brevity.

BRIEF DESCRIPTION OF THE DRAWINGS

Other objects, features and advantages of the present invention will become apparent from the detailed description of the preferred embodiments of the invention which follows, when considered in light of the accompanying drawings in which.

DESCRIPTION OF THE PREFERRED EMBODIMENTS

Figure 1A:
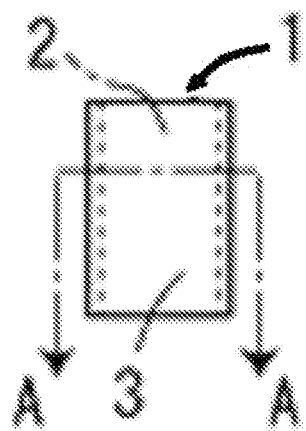
FIG. 1(A) is a side view schematically illustrating an example of a PO resin expanded bead according to the present invention.
Figure 1B:
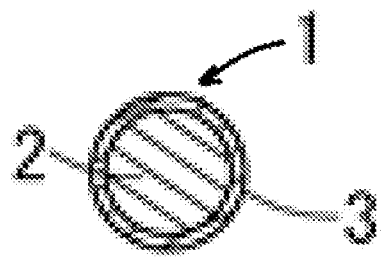
FIG. 1(B) is a cross-sectional view taken along the line A-A in FIG. 1(A)

Referring to FIG. 1(A) and FIG. 1(B), the reference numeral 1 denotes an inorganic filler-containing, PO resin expanded bead according to the present invention. The expanded bead 1 has an expanded core layer 2 that contains a first PO resin and an inorganic filler, and a cover layer 3 that covers the expanded core layer 2 and contains a second PO resin. In such an expanded bead, a part of the expanded core layer 2 may be uncovered with the cover layer 3 and exposed on the surface of the expanded bead 1, as long as the object of the present invention can be achieved and the intended effect of the present invention is not adversely affected. As an example of the structure in which the expanded core layer 2 is partially exposed, there may be mentioned a case in which the expanded core layer 2 has a cylindrical shape and in which only the peripheral surface of thereof is covered with the cover layer 3 with its top and bottom surfaces being exposed as shown in FIG. 1(A). Details of the constituents, structure, production method and properties of the expanded beads 1 will be described next.

Inorganic Filler:

The PO resin expanded beads according to the present invention each contain an inorganic filler. It is important that the inorganic filler should be contained in the expanded core layer. The kind and particle size of the inorganic filler are not specifically limited. Inorganic fillers capable of being uniformly dispersed in a thermoplastic resin may be preferably used for the purpose of the present invention because such inorganic fillers can be uniformly dispersed in a PO resin. It is also preferred that the inorganic filler has a small particle size for reasons of capability thereof of being dispersed in a PO resin.

Generally, the inorganic filler has an average particle size of about from 0.1 to 50 μm, and preferably from 0.5 to 20 μm. The average particle size of inorganic filler is measured using an electron photo microscope. Arbitrarily selected 100 inorganic filler are measured for their maximum diameters respectively. The average particle size is each an arithmetic mean of the maximum diameters of the 100 samples.

Examples of the inorganic filler include carbons such as carbon black and graphite; fibers such as glass fibers, metal fibers and carbon fibers; inorganic hydroxides such as aluminum hydroxide, calcium hydroxide and magnesium hydroxide; inorganic carbonates such as calcium carbonate, magnesium carbonate and barium carbonate; inorganic sulfites such as calcium sulfite and magnesium sulfite; inorganic sulfates such as calcium sulfate, magnesium sulfate and aluminum sulfate; inorganic oxides such as iron oxide, aluminum oxide, zinc oxide, silicon oxide, lead oxide, magnesium oxide, cobalt oxide, titanium oxide and calcium oxide; inorganic borates such as zinc borate, calcium borate, magnesium borate and aluminum borate; and clay or natural minerals such as talc, clay, kaolin and zeolite. These inorganic fillers may be used alone or in combination of two or more thereof.

Above all, inorganic oxides are preferred. For reasons of excellency in uniform dispersibility, abrasion resistance and scratch resistance, metal oxides such as iron oxide, aluminum oxide, zinc oxide, silicon oxide, lead oxide, calcium oxide, magnesium oxide, cobalt oxide and titanium oxide, are more preferred. Among the metal oxides, titanium oxide is particularly preferably used as the inorganic filler for reasons of good abrasion resistance. Titanium oxide may contain one or more other metal components such as iron, aluminum, zinc, lead, magnesium and cobalt.

Expanded Core Layer:

The expanded core layer has a multiplicity of cells defined by cell walls of a first PO resin composition and may be formed by foaming and expanding inorganic filler-containing, multilayer resin particles, described hereinafter, using a blowing agent.

The first PO resin contained in the first PO resin composition of the expanded core layer may be one selected from (a) olefin homopolymers, (b) copolymers of at least two olefins, (c) copolymers of at least 50% by weight of one or more olefins and less than less than 50% by weight of one or more comonomers other than an olefin, and (d) mixtures of two or more of these homopolymers and copolymers. The first PO resin composition may contain other thermoplastic resin and/or elastomer in an amount less than the weight of the first PO resin.

Examples of the olefin homopolymer (a) include polypropylene, polyethylene, polybutene and polypentene. Examples of the olefin copolymers (b) and (c) include ethylene copolymers containing at least 50% by weight of ethylene, such as ethylene-propylene copolymers, ethylene-butene copolymers, ethylene-vinyl acetate copolymers, ethylene-methacrylic acid copolymers, ethylene-methyl methacrylate copolymers and ethylene-maleic anhydride copolymers; ethylene-based ionomers obtained by cross-linking ethylene-methacrylic acid copolymers with metal ions; and propylene copolymers containing at least 50% by weight of propylene, such as propylene-ethylene copolymers, propylene-butene copolymers, propylene-ethylene-butene terpolymers, propylene-acrylic acid copolymers and propylene-maleic anhydride copolymers. These copolymers may be block copolymers, random copolymers or graft copolymers.

The first PO resin used in the first PO resin composition for forming the expanded core layer is preferably a polypropylene-based resin for reasons of its excellent rigidity, abrasion resistance, processability and low costs. Specific examples of the polypropylene-based resin include polypropylene (propylene homopolymer) and propylene copolymers containing at least 50% by weight of propylene such as propylene-ethylene random copolymers, propylene-butene random copolymers, propylene-ethylene-butene terpolymers and mixtures of two or more of these homopolymer and copolymers.

The first PO resin may be in a cross-linked form which is obtained by treatment with a peroxide or a radiation irradiation. Because of its easiness in obtaining uniform mixture with an inorganic filler, however, the first PO resin is preferably in a non-cross-linked form.

It is particularly preferred that the first PO resin of the expanded core layer is a mixture of an acid-free PO resin with a carboxylic acid-modified or carboxylic acid anhydride-modified PO resin. The term "acid-free PO resin" as used herein is intended to refer to PO resin that contains no carboxylic acids or carboxylic acid anhydrides. The acid-free PO resin may be preferably selected from the afore-mentioned first PO resins (a) to (d) provided that they contain no carboxylic acid or carboxylic acid anhydride components such as methacrylic acid and maleic anhydride. The carboxylic acid-modified or carboxylic acid anhydride-modified PO resin (hereinafter occasionally referred to as "acid-modified PO resin) is obtained by copolymerizing one or more monomers selected from acid anhydrides such as acetic anhydride, succinic anhydride, maleic anhydride and phthalic anhydride, and carboxylic acids such as methacrylic acid, maleic acid and acrylic acid, with a PO resin such as an acid-free PO resin described above. Particularly preferred acid-modified PO resin is a maleic anhydride-modified polypropylene.

It is preferred that the first PO resin of the expanded core layer contains the acid-modified PO resin in such an amount that a carboxylic acid or carboxylic acid anhydride component content of the first PO resin is 0.15 to 10% by weight, more preferably 0.2 to 8% by weight, still more preferably 0.3 to 6% by weight.

The carboxylic acid or carboxylic acid anhydride component content in the first PO resin of the expanded core layer is determined by the amount of the acid-modified PO resin mixed to the acid-free PO resin and the carboxylic acid or carboxylic acid anhydride modification amount of the acid-modified PO resin (i.e. amount of the carboxylic acid or carboxylic acid anhydride component based on the weight of the acid-modified PO resin).

The acid-modified PO resin preferably has a carboxylic acid or carboxylic acid anhydride modification amount of 0.5 to 15% by weight, more preferably 1 to 8% by weight, for reasons of compatibility between the first PO resin and the inorganic filler.

It is preferred that the acid-modified PO resin is contained in the expanded core layer in an amount of 3 to 30% by weight, more preferably 5 to 25% by weight, still more preferably 6 to 20% by weight, based on the weight of the expanded core layer. The first PO resin, when incorporated with an acid-modified PO resin, has an improved compatibility with the inorganic filler so that local variation in the apparent density of the expanded core layer is minimized.

With an increase of the using amount of the inorganic filler, cells of the expanded core layer are more likely to be broken during the preparation of the PO resin expanded beads or during the preparation of a molded article from the PO resin expanded beads, because the inorganic filler acts as cell breaking sites. The breakage of the cells has been found to be suppressed by using the acid-modified PO resin in a controlled amount. Thus, when the amount of the inorganic filler contained in the expanded core layer is made to be x % by weight and the amount of the carboxylic acid or carboxylic acid anhydride component (acid component) contained in the expanded core layer is made to be y % by weight, it is preferred that x and y meet the following formula (1):

$$0.008x+0.300 \geq y \geq 0.008x-0.125 \quad (1)$$

Figure 2:
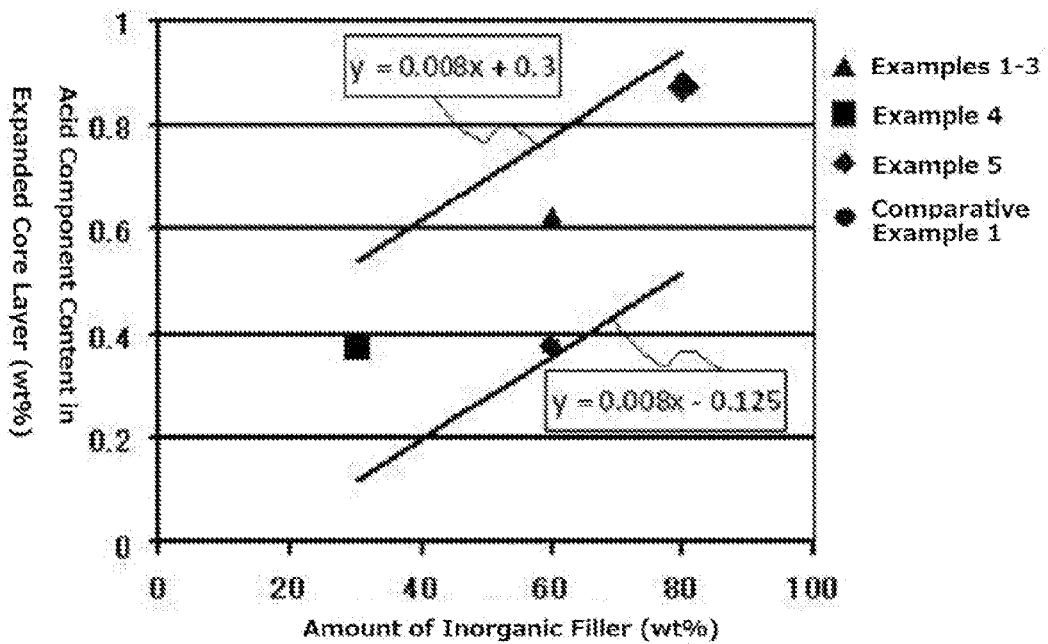
FIG. 2 is a graph showing a preferred range of a weight percentage amount of carboxylic acid or carboxylic acid anhydride component in an expanded core layer relative to a weight percentage amount of an inorganic filler in the expanded core layer.

The preferred range is also shown in FIG. 2.

As described previously, the inorganic filler should be contained in the expanded core layer and may be optionally also contained in the cover layer. The amount of the inorganic filler contained in the expanded core layer should be 5 to 90% by weight based on the weight of the expanded core layer. In other words, the expanded core layer should contain the inorganic filler in a weight percentage amount of 5 to 90%. The amount of the inorganic filler is preferably 30 to 85% by weight, more preferably 40 to 80% by weight, still more preferably 50 to 80% by weight, based on the weight of the expanded core layer for reasons of effectively imparting the function of the inorganic filler to the PO resin expanded beads and of obtaining good dispersed state of the inorganic filler in the expanded core layer.

The first PO resin composition that constitutes the expanded core layer may contain an additive such as an antioxidant, a UV absorbing agent, a flame retardant, an antistatic agent, a pigment, a dye, a nucleating agent and a cell controlling agent, if desired, as long as the effect of the present invention is not adversely affected.

Cover Layer:

The cover layer that covers the above-described expanded core layer of the PO resin expanded bead is constituted of a second PO resin composition containing a second PO resin. The second PO resin may be selected from those which are described above as examples of the first PO resin.

The cover layer contains no inorganic filler or contains an inorganic filler, which is the same or different from the inorganic filler contained in the expanded core layer, in a weight percentage amount lower than that of the inorganic filler in the expanded core layer.

Since the weight percentage amount of the inorganic filler in the cover layer is less than that in the expanded core layer, the fusion-bonding property of the cover layer is better than that of the expanded core layer and, hence, the PO resin expanded beads having such a layer structure (multi-layered PO resin expanded beads) can be more tightly fusion-bonded to each other during an in-mold molding step as compared with single layer PO resin expanded beads having the same composition as that of the expanded core layer. The better fusion-bonding property of the multi-layered PO resin expanded beads permit the in-mold molding step to be carried out at a lower molding pressure or may eliminate a pretreatment with a pressurized air for increasing inside pressure of the beads. This may also minimize a difference in apparent density between inside and outside regions of the obtained expanded beads molded articles. From this point of view, the weight percentage amount of the inorganic filler contained in the cover layer is preferably less than two thirds, more preferably less than half, still more preferably less than one fourths of that in the expanded core layer.

From the same point of view, the weight percentage amount of the inorganic filler contained in the cover layer is preferably less than 20% by weight, more preferably less than 10% by weight, still more preferably less than 5% by weight, particularly preferably contains no inorganic filler, based on the weight of the cover layer.

The cover layer may be in an expanded or unexpanded state. For reasons of high fusion bonding strength between expanded beads of expanded beads molded articles, however, the cover layer preferably has a lower expansion ratio than the expanded core layer and, more preferably is in an unexpanded or substantially unexpanded state.

It is important that a weight ratio of the cover layer to the expanded core layer is 1:99 to 20:80 in order to properly cover the expanded core layer with the cover layer and to obtain expanded beads having excellent fusion bonding property even when the expanded core layer contains a large amount of the inorganic filler. From this point of view, the weight ratio of the cover layer to the expanded core layer is preferably 1:99 to 15:85, more preferably 1:99 to 10:90.

It is preferred that the second PO resin of the cover layer shows no melting point or has a melting point (MP2) lower than the melting point (MP1) of the first PO resin of the expanded core layer in order to obtain a desired expanded beads molded article even when the in-mold molding is carried out using a relatively low heated steam pressure.

Thus, a difference (MP1-MP2) in melting point between the first and second PO resins is preferably not lower than 0 and not greater than 50° C. (50≥(MP1-MP2)≥0), more preferably greater than 0 and not greater than 45° C. (45≥(MP1-MP2)≥0), still more preferably not lower than 5° C. and not greater than 40° C. (40≥(MP1-MP2)≥5). When the second PO resin of the cover layer shows no melting point, as in the case of an amorphous polyolefin resin, the Vicat softening point of the second PO resin is preferably lower, more preferably lower by at least 5° C., than a melting point of the first PO resin constituting the expanded core layer. The upper limit of the difference between the melting point of the first PO resin and the Vicat softening point of the second PO resin is generally about 100° C.

The PO resin expanded beads, in which the first PO resin of the expanded core layers and the second PO resin of the cover layers meet the foregoing requirements, can be fuse-bonded to each other without need of a high heated steam pressure and can produce a desired expanded beads molded article by in-mold molding using a relatively low heated steam pressure.

It is preferred that the PO resin expanded beads of the present invention, when measured by heat flux differential scanning calorimetry in which 2 to 10 mg thereof are heated from 23° C. to 220° C. at a heating rate of 10° C./min, give a DSC curve (first heating run DSC curve) having an endothermic peak "A" which is intrinsic to the polypropylene-based resin (hereinafter occasionally referred to simply as "intrinsic peak") and one or more endothermic peaks "B" (hereinafter occasionally referred to simply as "high temperature peak") which are located on a higher temperature side of the intrinsic peak. It is also preferred that a percentage proportion of the heat of fusion of the high temperature peak (hereinafter occasionally referred to as "high temperature peak calorific value") based on a total heat of fusion of the endothermic peaks (the total of the heat of fusion of the intrinsic peak and the heat of fusion of the high temperature peak) is 10% or more, more preferably 15% or more, still more preferably 20% or more. The upper limit of the percentage proportion of the high temperature peak calorific value is generally 40%, preferably 30%. When the high temperature peak calorific value is within the above range, it is possible to fuse-bond the expanded beads while controlling the secondary expansion thereof, so that an expanded beads molded article having a uniform density is obtainable.

The first time run heating DSC curve, heat of fusion of the intrinsic peak and heat of fusion of the high temperature peak are measured by a measuring method according to JIS K7122 (1987). The high temperature peak of expanded beads may be controlled by conventional method such as a method disclosed in U.S. Pat. No. 7,531,116.

The average particle diameter of the PO resin expanded beads of the present invention is preferably 0.5 to 10 mm, more preferably 0.8 to 5 mm, still more preferably 1 to 3 mm. The average particle diameter as used herein is measured as follows. Expanded beads are placed in the atmosphere of 23° C., 1 atm and a relative humidity of 50% for 2 days, from which 200 beads are chosen at random. Each of the 200 beads is measured for its maximum length using a caliper. The arithmetic mean of the measured maximum lengths of the 200 beads is the average particle diameter of the PO resin expanded beads. The shape of the PO resin expanded beads of the present invention is not specifically limited and may be, for example, a cylindrical column, a sphere, a rectangular column, an oval sphere or a cylinder.

The PO resin expanded beads of the present invention preferably have a bulk density of 0.03 to 1.5 g/cm$^3$, more preferably 0.05 to 1.2 g/cm$^3$, still more preferably 0.05 to 0.8 g/cm$^3$.

As described in the foregoing, in the PO resin expanded bead according to the present invention, the expanded core layer thereof contains an inorganic filler in a weight percentage amount of 5 to 90%, while the cover layer contains no inorganic filler or contains an inorganic filler in a weight percentage amount lower than that of the inorganic filler in the expanded core layer. Therefore, the PO resin expanded bead shows good fusion bonding property in its surface, even when its inorganic filler content is high.

Therefore, when such PO resin expanded beads having a high inorganic filler content are subjected to an in-mold molding process, the molding pressure can be lowered. Yet, the obtained expanded beads molded article has good bead-to-bead fusion bonding strength and uniform inorganic filler distribution. Further, it is possible to produce expanded beads molded articles having various inorganic filler contents at will.

Description will next be made of a method for producing the PO resin expanded beads of the present invention.

In one preferred method, two-layer resin particles each composed of a PO resin particle core layer and a PO resin particle cover layer which covers the particle core layer are first prepared. Thus, a first extruder for forming the resin particle core layer and a second extruder for forming the cover layer, which are connected to a coextrusion die, are provided. A first PO resin, an inorganic filler and, if needed, additives such as a cell controlling agent are fed to the first extruder and melted and kneaded to obtain a first melt. On the other hand, a second PO resin and, if needed, additives such as an inorganic filler are fed to the second extruder and melted and kneaded to obtain a second melt. The first and second melts are fed to the coextrusion die and extruded therethrough in the form of a plurality of strands each having a core-sheath structure in which the first melt for forming the resin particle core layer is surrounded by and laminated with the second melt for forming the resin particle cover layer. By cutting the strands into suitable lengths after having been passed through water or by simultaneously cutting and cooling the strands as soon as the melt has been extruded through the die into water, two-layer resin particles each having a desired weight may be obtained.

When an acid-modified PO resin is to be incorporated into the first PO resin, the acid-modified PO resin may be fed to the first extruder as such or in the form of a master batch using an acid-free PO resin. Alternatively, the inorganic filler to be fed to the first extruder is first kneaded and pretreated with the acid-modified PO resin, the resulting mixture being then introduced into the first extruder and kneaded with the acid-free PO resin. In this manner, the first melt for forming the resin particle core layer of the PO resin particles may be prepared.

The PO resin expanded beads of the present invention may be prepared from the above-described two-layer resin particles by a method, in which the resin particles are dispersed in a dispersing medium, such as water, contained in a closed vessel such as autoclave together with a physical blowing agent, etc. The dispersing medium is then heated to impregnate the resin particles with the blowing agent. Then, an end portion of the closed vessel is opened to release the blowing agent-impregnated resin particles together with the dispersing medium from the closed vessel to an atmosphere which is maintained at a pressure lower than that in the closed vessel, generally atmospheric pressure, to foam and expand the resin particles, thereby obtaining the expanded beads of the present invention. In an alternative method, the blowing agent-impregnated expandable resin particles are taken out of the closed vessel and heated with a suitable heating medium such steam to foam and expand the resin particles. The PO resin expanded beads thus obtained each have an expanded PO resin core layer, which is formed from the resin particle core layer, and a PO resin cover layer which covers the PO resin expanded core layer and which is formed from the resin particle cover layer.

The blowing agent may be an organic or inorganic physical blowing agent. Examples of the organic physical blowing agent include aliphatic hydrocarbons such as propane, butane, pentane, hexane and heptane, and alicyclic hydrocarbons such as cyclobutane and cyclohexane. Examples of the inorganic physical blowing agent include air, nitrogen, carbon dioxide, oxygen, argon and water.

A PO resin expanded beads molded article with any desired shape may be produced by using the above-described PO resin expanded beads each having a PO resin expanded core layer and a PO resin cover layer. The molded article has a suitable apparent density and good fusion bonding strength between the expanded beads.

The PO resin expanded molded article generally has an apparent density of 0.05 to 0.8 g/cm$^3$. The apparent density of the molded article may be calculated by dividing its weight by its volume that is determined from its outer dimensions.

The expanded molded article preferably shows a high fusion bonding strength between its expanded beads of at least 60%, more preferably at least 70%, still more preferably at least 80%, from the standpoint of its mechanical strength such as bending strength.

The term "fusion bonding strength" as used herein is intended to refer to a material failure percentage that is measured as follows. A sample of the molded article is bent and ruptured. The ruptured cross section is observed to count a number (C1) of the expanded beads present on the ruptured surface and a number (C2) of the broken expanded beads among them. The percentage (C2/C1×100) of the broken expanded beads based on the expanded beads present on the surface is calculated as a material failure percentage. The above procedure was repeated on five different samples in total. The arithmetic mean of the five material failure percentages represents the fusion bonding strength. The measurement should be done on a ruptured cross section including at least 100 expanded beads.

The molded article according to the present invention may be produced by filling the above-described PO resin expanded beads in a mold cavity and heating the expanded beads with steam by customarily known method. As a result of the heating of the expanded beads in the mold cavity, the cover layers of neighboring expanded beads are fusion-bonded to each other and, additionally, the expanded beads in the mold cavity are further expanded (secondary expansion) to fill the void spaces between the expanded beads, thereby forming an integral molded product composed of mutually fusion-bonded expanded beads. The molded product is then cooled and taken out of the mold to obtain a PO resin expanded beads molded article.

Because the cover layer of the PO resin expanded beads of the present invention show good fusion bonding property at the temperature at which the in-mold molding by steam heating is carried out, it is possible to use a lower heated steam pressure than that required for in-mold molding of single-layer PO expanded beads which do not have the PO resin cover layer and which are composed of the same composition as that of the PO expanded core layer.

with an acid-modified PO resin which is a maleic anhydride-modified polypropylene (hereinafter referred to as MPP for brevity) manufactured by Toyobo Co., Ltd. (product name: H3000P) and having a maleic anhydride modification amount (maleic anhydride component content) of 5% by weight. The weight ratio of Resin 1 to MPP (Resin 1/MPP), and the kind, average particle size and amount (weight percentage amount based on the first PO resin composition) of the inorganic filler were as shown in Table 2. The first PO resin and the inorganic filler were fed to a twin screw extruder with an inside diameter of 30 mm, where it was melted and kneaded at 200 to 220° C. The kneaded mass was extruded in the form of strands, cooled and cut to obtain the first PO resin composition in the form of pellets.

TABLE 2

| | First PO resin composition | | | | | | | Second PO resin composition | | | Properties of resin particles | |
|---|---|---|---|---|---|---|---|---|---|---|---|---|
| | First PO resin | | | | Inorganic filler | | | Second PO resin | | | Difference | Core/cover |
| | Kind | Amount (wt %) | Melting point (° C.) | MAH content (wt %) | Kind | Particle size (μm) | Amount (wt %) | Kind | wt % | Melting point (° C.) | in melting point (° C.) | weight ratio |
| Example 1 | Resin1/MPP | 27.5/12.5 | 136 | 1.56 | TiO$_2$ | 4 | 60 | Resin 2 | 100 | 131 | 5 | 93.7/6.3 |
| Example 2 | Resin 1/MPP | 27.5/12.5 | 136 | 1.56 | Fe$_2$O$_3$ | 10 | 60 | Resin 2 | 100 | 131 | 5 | 93.7/6.3 |
| Example 3 | Resin 1/MPP | 27.5/12.5 | 136 | 1.56 | Mg(OH)$_2$ | 1 | 60 | Resin 3 | 100 | 125 | 11 | 93.7/6.3 |
| Example 4 | Resin 1/MPP | 62.5/7.5 | 136 | 0.54 | TiO$_2$ | 6 | 30 | Resin 2 | 100 | 131 | 5 | 95.2/4.8 |
| Example 5 | Resin 1/MPP | 2.5/17.5 | 136 | 4.38 | TiO$_2$ | 4 | 80 | Resin 4 | 100 | 100 | 36 | 90.1/9.9 |
| Comparative Example 1 | Resin 1/MPP | 32.5/7.5 | 136 | 0.94 | TiO$_2$ | 4 | 60 | — | — | — | — | 100/0 |

The molded article thus produced exhibit various functionalities by appropriately selecting the amount and kind of the inorganic filler and may be used for various applications.

The following examples and comparative example will further illustrate the present invention.

Examples 1 to 5

PQ Resin

PO resins used for the preparation of PO resin expanded beads are shown in Table 1.

TABLE 1

| PO resin No. | PO resin | MFR (g/10 min) | Tensile modulus (MPa) | Melting point (° C.) |
|---|---|---|---|---|
| Resin 1 | Ethylene-propylene random copolymer | 8 | 660 | 136 |
| Resin 2 | Ethylene-butene-propylene terpolymer | 6 | 670 | 131 |
| Resin 3 | Ethylene-butene-propylene terpolymer | 7 | 700 | 125 |
| Resin 4 | linear low density polyethylene | 2 | 114 | 100 |

Preparation of Pelletized First PO Resin Composition for Expanded Core Layer:

The first PO resin composition for forming an expanded core layer of PO resin expanded beads of Examples 1 to 5 contained a first PO resin and an inorganic filler. As the first PO resin, Resin 1 shown in Table 1 was used in combination In Table 2, "MAH content" is a weight percentage amount of the maleic anhydride component based on the weight of the first polyolefin-based resin (total weight of Resin 1 and MPP); "difference in melting point" is a difference in melting point between Resin 1 and Resin 2, 3 or 4; and "core/cover weight ratio" is a weight percentage ratio of the particle core layer to the particle cover layer of the resin particles produced from the first and second PO resin compositions, respectively, in the manner as described below.

Preparation of Resin Particles:

An extrusion device having a first extruder for forming a resin particle core layer (inside diameter 65 mm), a second extruder for forming a resin particle cover layer (inside diameter 30 mm) and a coextrusion die for forming multi-layer strands which was attached to exits of the extruders was used. The pelletized first PO resin composition obtained above was fed to the first extruder, while the second PO resin composition (composed only of the second PO resin shown in Table 2) was fed to the second extruder. The feed amounts of the first and second PO resin compositions were controlled so as to provide the core/cover weight percentage ratio shown in Table 2. The materials thus fed were each heated, melted and kneaded and thereafter introduced into the coextrusion die and combined. The combined stream was then coextruded in the form of multi-layer strands through small holes of a mouthpiece attached to a die exit of the extruder. The strands each had a core-sheath structure in which the peripheral surface of a core layer was covered with an outer layer. The coextruded strands were cooled with water and cut with a pelletizer into columnar two-layer resin particles.

Production of PO Resin Expanded Beads:

The obtained two-layer resin particles (800 g) were charged in a 5 L closed vessel together with 3 L of water as a dispersing medium, to which 0.3 parts by weight of kaolin as a dispersing agent, 0.4 parts by weight (as an active component) of a surfactant (sodium alkylbenzenesulfonate, Trade name: Neogen, manufactured by Dai-ichi Kogyou Seiyaku Co., Ltd.) and 0.01 parts of aluminum sulfate per 100 parts by weight of the two-layer resin particles were added. Carbon dioxide as a blowing agent was then injected into the closed vessel in an amount shown in Table 3. The contents were heated with stirring to a temperature 5° C. lower than the foaming temperature shown in Table 3 and then maintained at that temperature for 15 minutes to adjust high temperature peak calorific value. After having been heated to the foaming temperature shown in Table 3 and maintained at that temperature for another 15 minutes, the contents were released to atmospheric pressure together with the water to obtain two-layered expanded beads. The bulk density, high temperature peak calorific value, percentage proportion of the high temperature calorific value based on a total heat of fusion of the endothermic peaks of the obtained two-layered PO resin expanded beads are summarized in Table 3.

TABLE 3

| | Foaming temperature ° C. | Carbon dioxide pressure MPa(G) | Bulk density g/cm$^3$ | High temperature peak calorific value J/g | Proportion of high temperature peak calorific value % |
|---|---|---|---|---|---|
| Example 1 | 145.0 | 2.4 | 0.14 | 5.3 | 27.2 |
| Example 2 | 144.5 | 2.7 | 0.14 | 6.6 | 29.4 |
| Example 3 | 145.0 | 2.1 | 0.14 | 6.5 | 28.7 |
| Example 4 | 147.5 | 1.9 | 0.14 | 9.3 | 24.0 |
| Example 5 | 145.0 | 2.4 | 0.21 | 1.8 | 29.5 |
| Comparative Example 1 | 145.0 | 2.4 | 0.16 | 7.2 | 30.2 |

Production of Molded Articles:

The above obtained expanded beads were placed, by a cracking filling method, in a mold cavity adapted for forming a flat plate having a length of 300 mm, a width of 200 mm and a thickness of 60 mm, and subjected to in-mold molding by steam heating to obtain plate-like foamed molded articles. The heating was performed in such a way that steam was fed for 5 seconds for preheating (air purging step) while maintaining drain valves on both side molds in an open state and, thereafter, one-direction flow heating was carried out at a pressure lower by 0.08 MPa(G) than that for full heating as shown in Table 4. Then, reversed one-direction flow heating was performed at a pressure lower by 0.04 MPa(G) than that for the full heating. Finally, the full heating was performed at a molding steam pressure shown in Table 4. After completion of the heating, the pressure was released and was cooled with air for 30 seconds. The mold was then opened. The molded article was taken out of the mold cavity and aged in an oven at 80° C. for 12 hours, thereby obtaining the expanded beads molded article having physical properties shown in Table 4.

TABLE 4

Molding conditions and properties of the molded articles

| | Inside pressure of expanded beads MPa(G) | Molding steam pressure MPa(G) | Apparent density g/cm$^3$ | Fusion bonding strength |
|---|---|---|---|---|
| Example 1 | 0 | 0.20 | 0.17 | excellent |
| Example 2 | 0 | 0.22 | 0.16 | excellent |
| Example 3 | 0 | 0.14 | 0.18 | excellent |
| Example 4 | 0 | 0.20 | 0.17 | excellent |
| Example 5 | 0 | 0.24 | 0.26 | excellent |
| Comparative Example 1 | 0 | 0.20 | Molded article was not obtained because of poor fusion bonding | |
| | 0.16 | 0.26 | 0.17 | poor |

Comparative Example 1

In Comparative Example 1, resin particles were produced in the same manner as that in Example 1 except that no particle cover layer was formed. Namely, as shown in Table 2, single layer resin particles were prepared using a first PO resin composition containing 40% by weight of a first PO resin and 60% by weight of an inorganic filler. The obtained resin particles were foamed and expanded in the same manner as that in Example 1 to obtain single layer PO resin expanded beads having properties shown in Table 3. When the obtained expanded beads were subjected to an in-mold molding process under the same conditions as those in Example 1, a molded article was not obtainable because of poor fusion bonding properties of the expanded beads. When the molding steam pressure was increased for the purpose of forcedly fusion-bond the expanded beads, the cells of the expanded beads were converted into open-cells and, therefore, a molded article was not obtained.

The expanded beads obtained in Comparative Example 1 were treated with pressurized air to increase the inside pressure thereof to a value shown in Table 4 and to improve the secondary expansion property thereof. Thereafter, the treated expanded beads were subjected to an in-mold molding process under the condition shown in Table 4. As a result a molded article having the property shown in Table 4 was obtained. However, the molded article showed poor fusion bonding strength. Unlike Examples 1 to 5 of the present invention, the expanded beads of Comparative Example 1 were unable to give a satisfactory molded article when the thickness thereof was relatively large.

The properties of the expanded beads and expanded beads molded articles were measured or evaluated by the following methods.

Bulk Density of Expanded Beads:

The bulk density of expanded beads was measured by the following method. Expanded beads were filled in an empty 1 L graduated cylinder up to the 1 L mark. The weight (g) of the expanded beads contained in the graduated cylinder was then measured, from which the bulk density (g/cm$^3$) was determined.

Apparent Density of Molded Article:

The apparent density of a molded article was determined by dividing its weight (g) by its volume (cm$^3$) measured from its outer dimensions.

Fusion Bonding Strength:

Fusion bonding strength was evaluated in the manner described previously and was rated as follows:

Excellent: Fusion bonding strength is 80% or more
Good: Fusion bonding strength is 60% or more and less than 80%
Poor: Fusion bonding strength is less than 60%

High Temperature Peak Calorific Value:

From produced expanded beads, ten (10) expanded beads were sampled at random. Each sample was measured for its DSC curve, from which a high temperature peak calorific value and a percentage of the high temperature peak calorific value based on a total heat of fusion of the endothermic peaks were determined in the manner as described previously. Arithmetic mean of the high temperature peak calorific values of the ten expanded bead samples represents the high temperature peak calorific value of the expanded beads product. Similarly, arithmetic mean of the percentage proportions of the ten expanded bead samples represents the percentage proportion of the high temperature peak calorific value of the expanded beads product.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2013-256534, filed Dec. 11, 2013, inclusive of the specification, claims and drawings, are hereby incorporated by reference herein.

What is claimed is:

1. A polyolefin-based resin expanded bead, comprising an expanded core layer comprising a first polyolefin-based resin, and a cover layer that covers the expanded core layer and that comprises a second polyolefin-based resin, wherein a weight ratio of the cover layer to the expanded core layer is 1:99 to 20:80, the expanded core layer contains an inorganic filler in a weight percentage amount of 30% or more and 90% or less, and the cover layer contains no inorganic filler or contains an inorganic filler, which is the same or different from the inorganic filler contained in the expanded core layer, in a weight percentage amount lower than that of the inorganic filler in the expanded core layer.

2. The polyolefin-based resin expanded bead according to claim 1, wherein the first polyolefin-based resin contains a carboxylic acid-modified or carboxylic acid anhydride-modified polyolefin resin in such an amount that a carboxylic acid or carboxylic acid anhydride component content in the first polyolefin-based resin is 0.15 to 10% by weight.

3. The polyolefin-based resin expanded bead according to claim 1, wherein the weight percentage amount of the inorganic filler in the cover layer is less than 5% or no inorganic filler is contained in the cover layer.

4. The polyolefin-based resin expanded bead according to claim 1, wherein the expanded core layer contains the inorganic filler in a weight percentage amount of 40 to 80%.

5. The polyolefin-based resin expanded bead according to claim 1, wherein the inorganic filler is an inorganic oxide.

* * * * *